United States Patent
Kumar et al.

(10) Patent No.: US 12,267,801 B2
(45) Date of Patent: Apr. 1, 2025

(54) METHOD AND APPARATUS FOR INDICATING MT-SERVICE FOR MULTI-SIM UE

(71) Applicant: Samsung Electronics Co., Ltd., Suwon-si (KR)

(72) Inventors: Lalith Kumar, Bengaluru (IN); Kundan Tiwari, Bihar (IN); Erik Guttman, Staines-Upon-Thames (GB); Mangesh Ingale, Bengaluru (IN); Prasad Basavaraj Dandra, Bengaluru (IN); Tushar Vrind, Bengaluru (IN); Krishna Sumanth Vemuri, Bengaluru (IN); Umasankar Ceendhralu Baskar, Bengaluru (IN); Vijay Ganesh Surisetty, Bengaluru (IN); Lalit Kumar Pathak, Bengaluru (IN); Ramkumar Thirumalli Sureshsah, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 475 days.

(21) Appl. No.: 17/621,206

(22) PCT Filed: Jun. 19, 2020

(86) PCT No.: PCT/KR2020/008003
§ 371 (c)(1),
(2) Date: Dec. 20, 2021

(87) PCT Pub. No.: WO2020/256489
PCT Pub. Date: Dec. 24, 2020

(65) Prior Publication Data
US 2022/0330194 A1  Oct. 13, 2022

(30) Foreign Application Priority Data

Jun. 21, 2019 (IN) .............................. 201941024752
Aug. 13, 2019 (IN) .............................. 201941032745
Jun. 18, 2020 (IN) .............................. 201941024752

(51) Int. Cl.
H04W 60/00 (2009.01)
H04W 8/18 (2009.01)
(Continued)

(52) U.S. Cl.
CPC ......... *H04W 60/005* (2013.01); *H04W 8/183* (2013.01); *H04W 8/26* (2013.01); *H04W 72/23* (2023.01)

(58) Field of Classification Search
CPC ..... H04W 60/005; H04W 8/183; H04W 8/26; H04W 72/23; H04W 68/02; H04W 60/00
See application file for complete search history.

(56) References Cited

U.S. PATENT DOCUMENTS

2016/0353449 A1   12/2016   Chuttani et al.
2017/0325278 A1   11/2017   Ramkumar et al.
(Continued)

FOREIGN PATENT DOCUMENTS

WO   2017/194128 A1   11/2017

OTHER PUBLICATIONS

3GPP TS 23.502 V15.5.1 (Apr. 2019); (Year: 2019).*
(Continued)

*Primary Examiner* — Mohammed S Chowdhury

(57) ABSTRACT

A method and apparatus of an AMF controller in a wireless communication system are provided. The method and apparatus include: registering a first SIM based on a first registration request message and registering a second SIM based on a second registration request message which has a GUTI
(Continued)

for the first SIM. Further, the method and apparatus include: receiving at least one of downlink data and signaling information for the second SIM when a N1 NAS is in CM-Connected state for the first SIM, and transmitting a NAS message indicating at least one of the downlink data and the signaling information for the second SIM over the N1 NAS connection of the first SIM.

10 Claims, 12 Drawing Sheets

(51) Int. Cl.
  *H04W 8/26*   (2009.01)
  *H04W 72/23*   (2023.01)

(56) References Cited

U.S. PATENT DOCUMENTS

2017/0359813 A1   12/2017   Lee
2020/0305118 A1*   9/2020   Ryu ................ H04W 60/04
2021/0352619 A1*   11/2021   Ryu ................ H04W 60/04
2022/0303934 A1*   9/2022   Ianev ............... H04W 8/183

OTHER PUBLICATIONS

GSM Association, "Multi SIM Devices Requirements Test Cases", Version 2.0, Jun. 14, 2018, 90 pages.
Notification of Transmittal of the International Search Report and The Written Opinion of the International Searching Authority, or the Declaration dated Sep. 21, 2020 in connection with International Patent Application No. PCT/KR2020/008003, 10 pages.

* cited by examiner

[Fig. 1A]
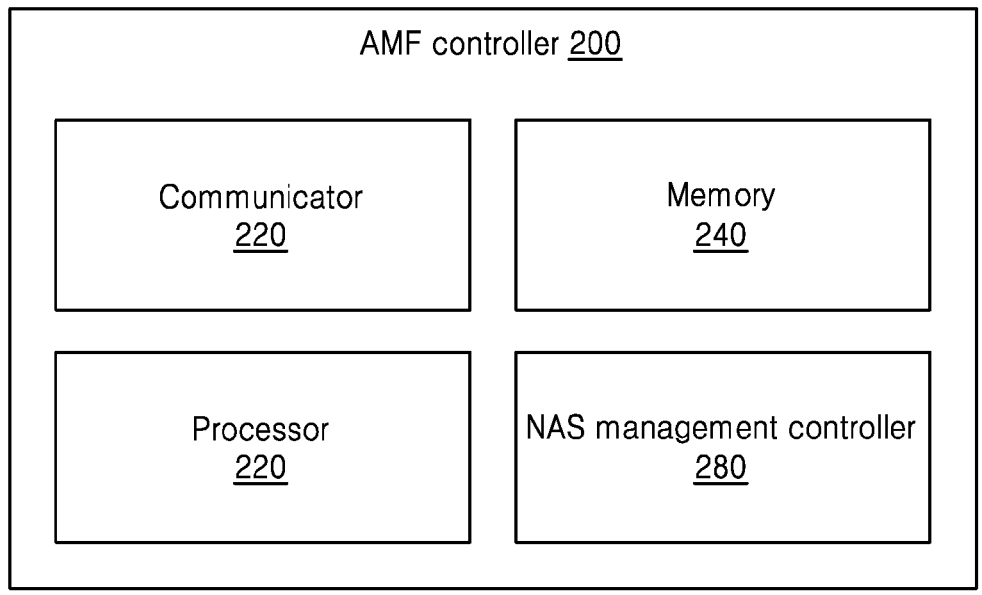
[Fig. 1B]
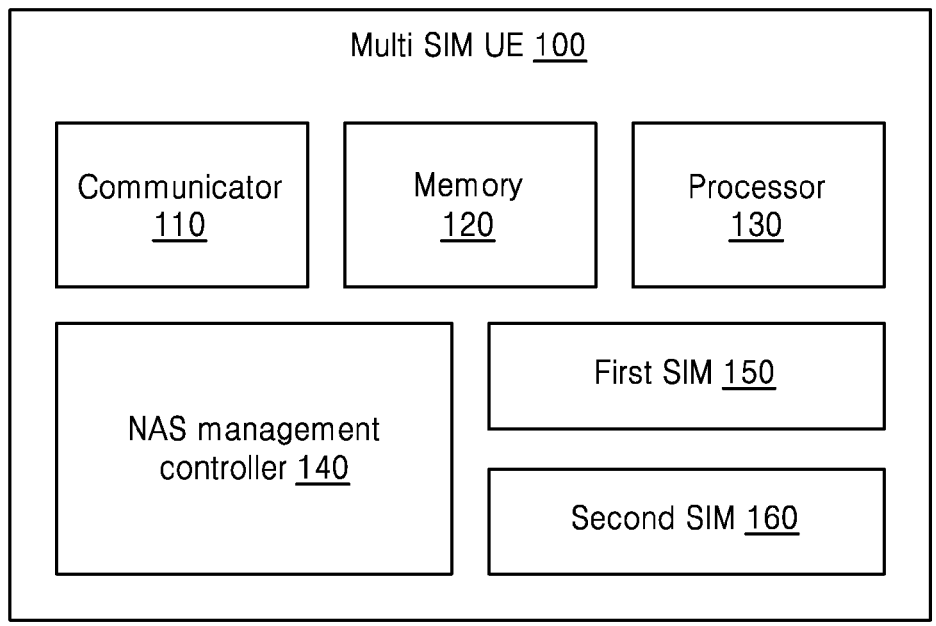

[Fig. 2A]
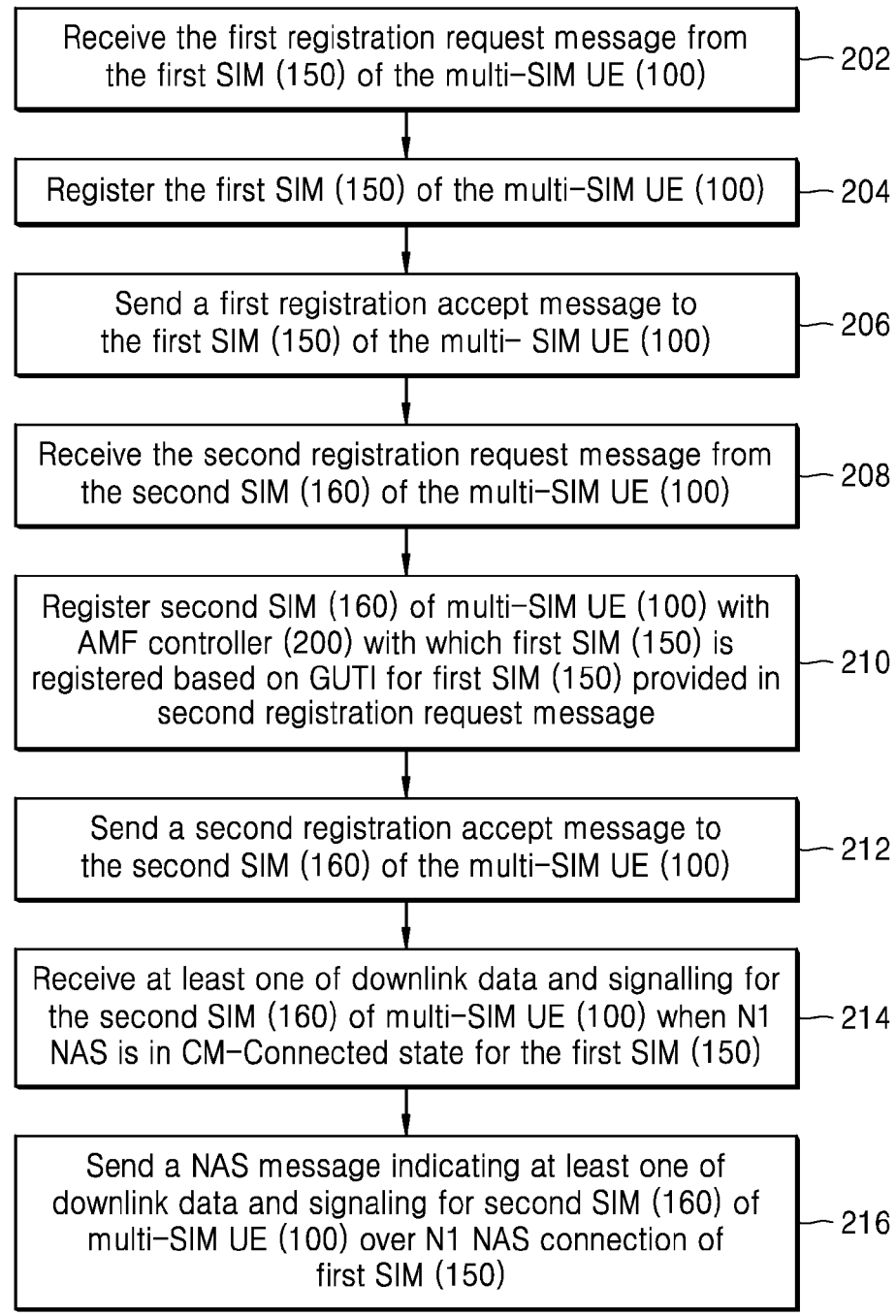

[Fig. 2B]
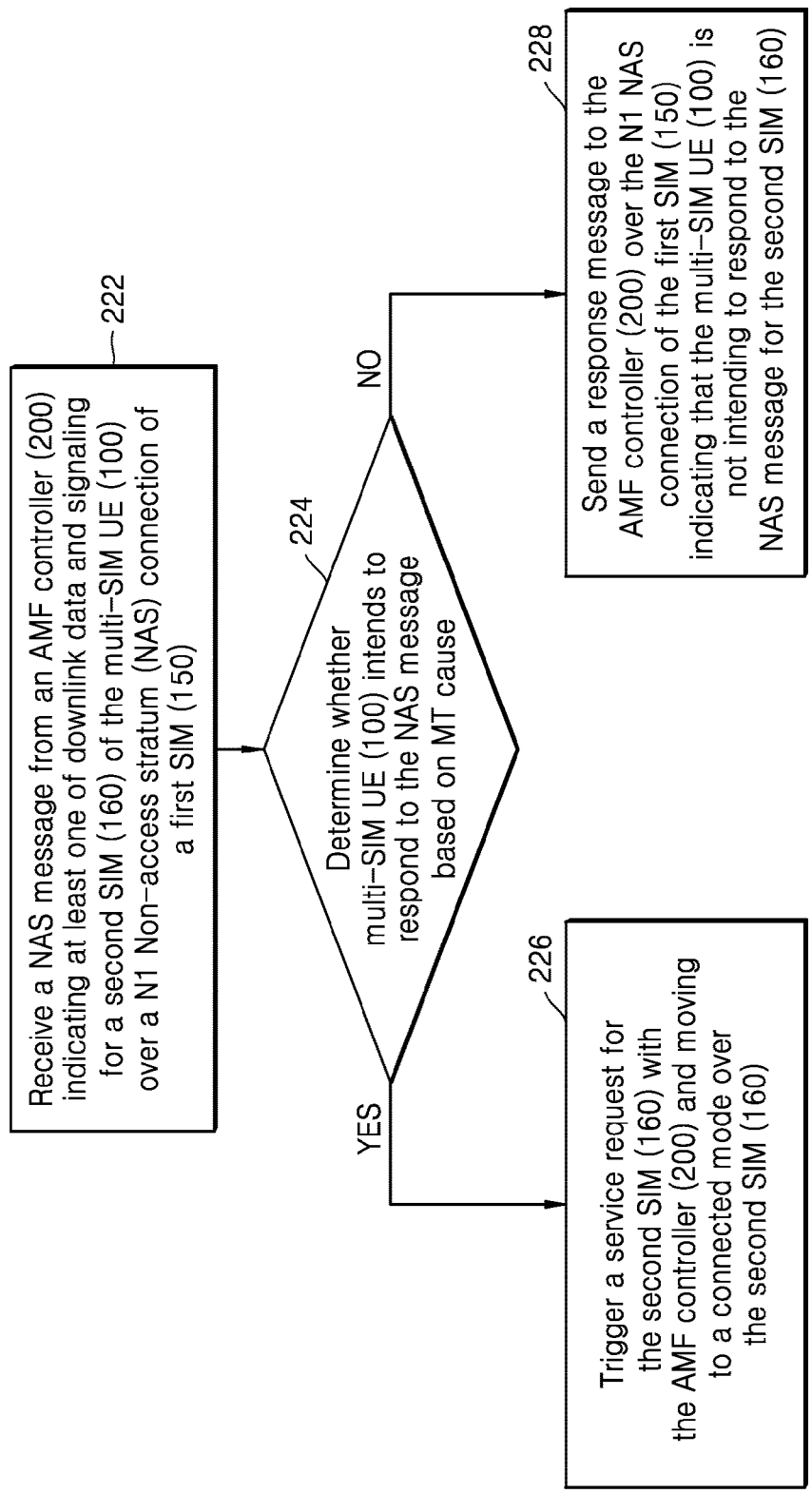

[Fig. 3]
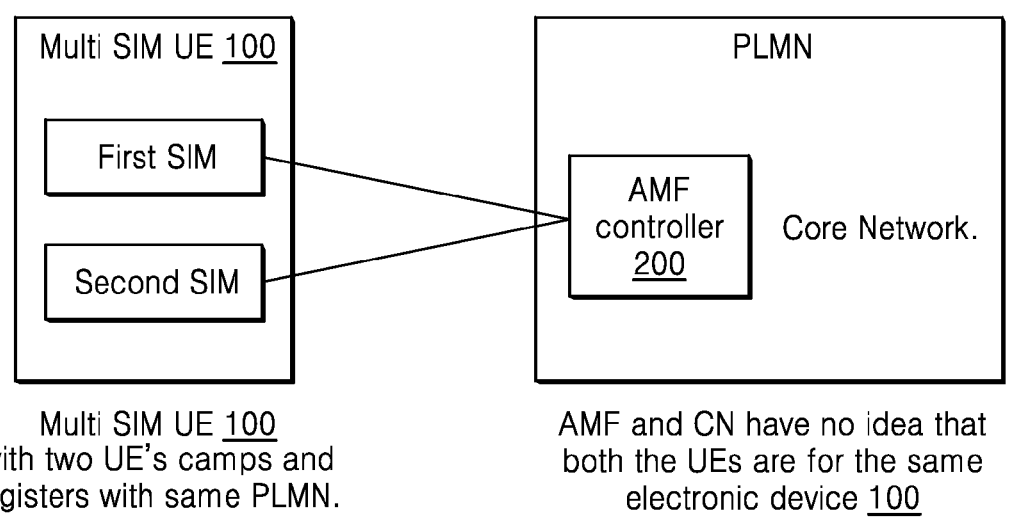

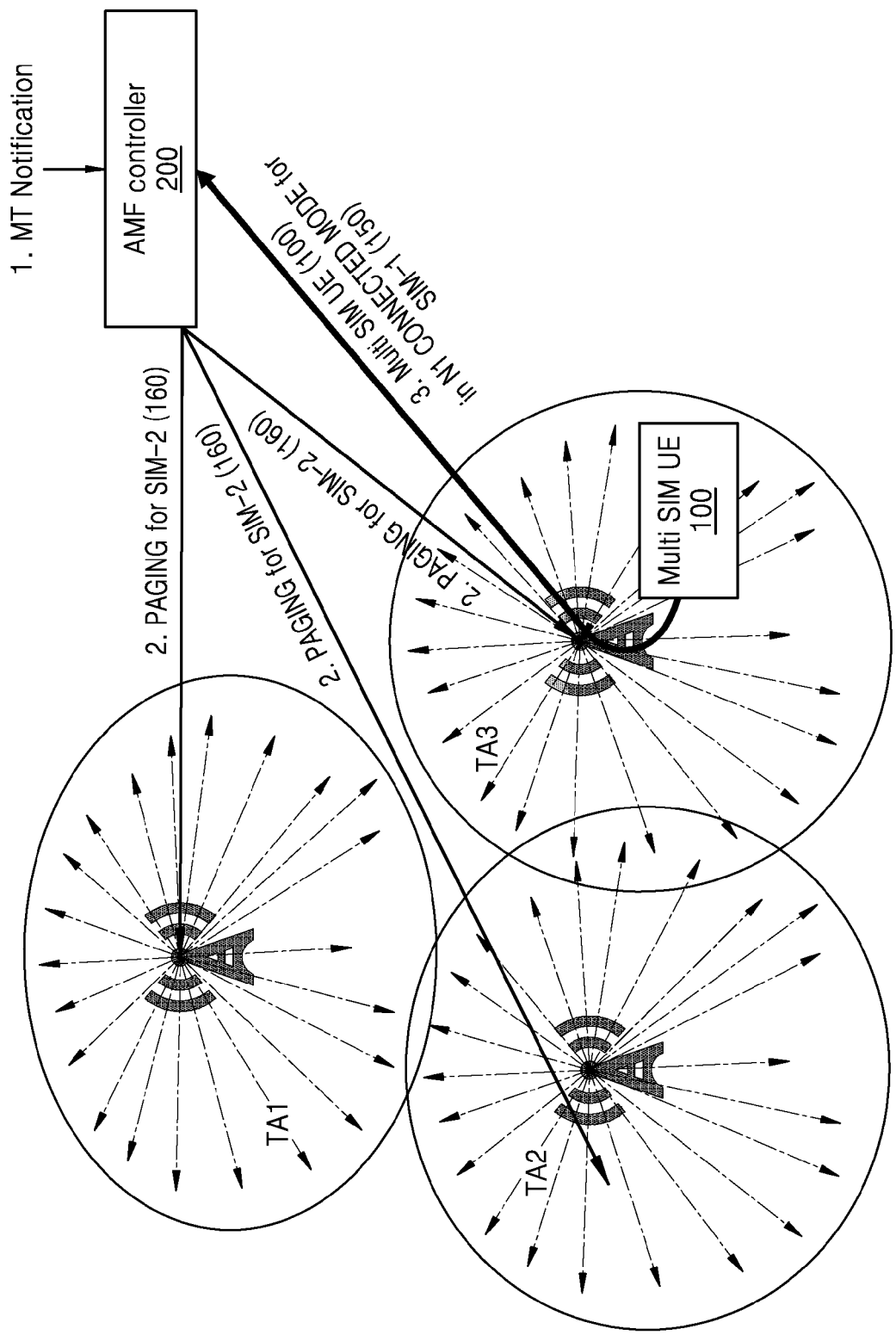
[Fig. 4]

[Fig. 5]
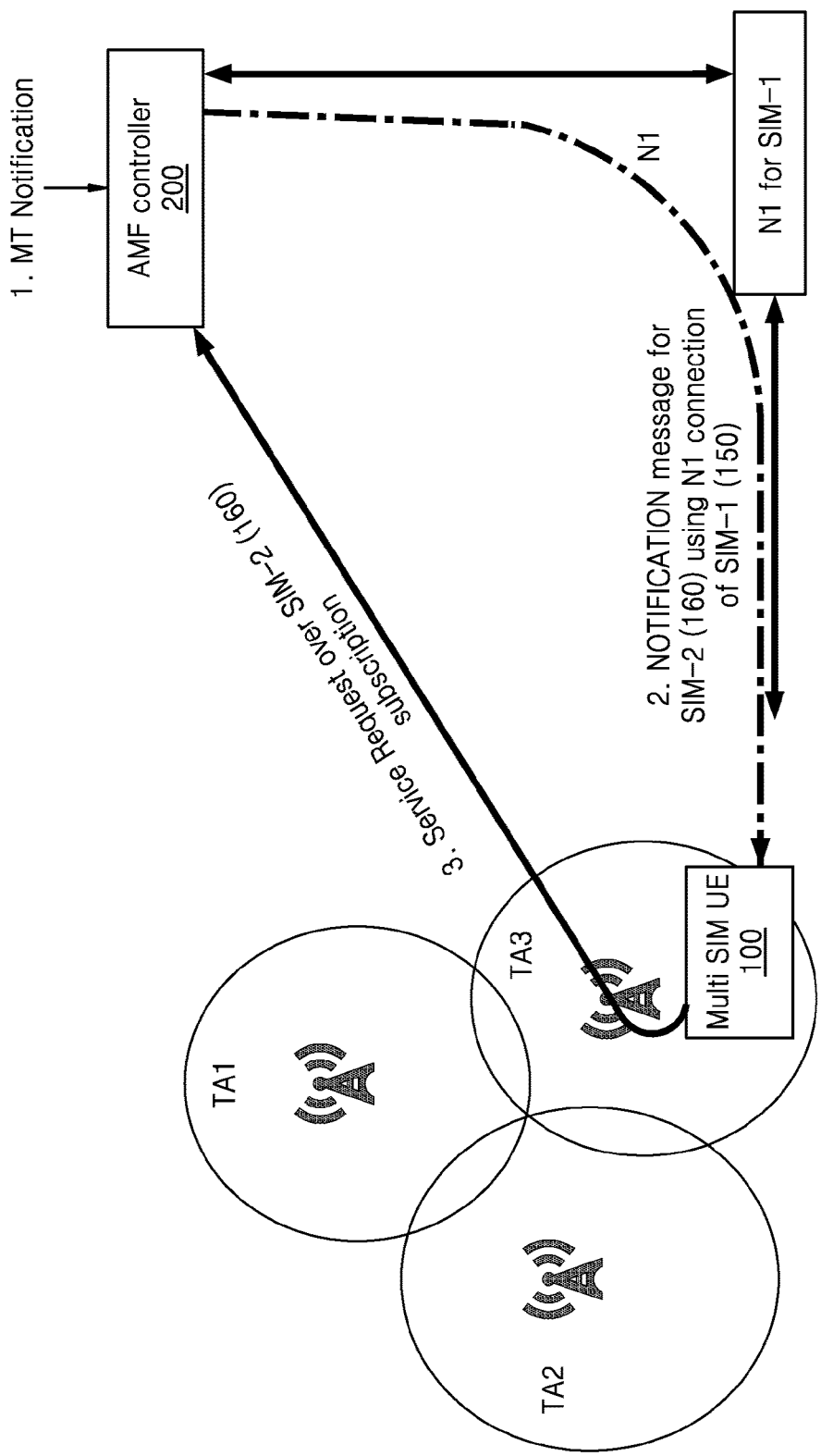

[Fig. 6]
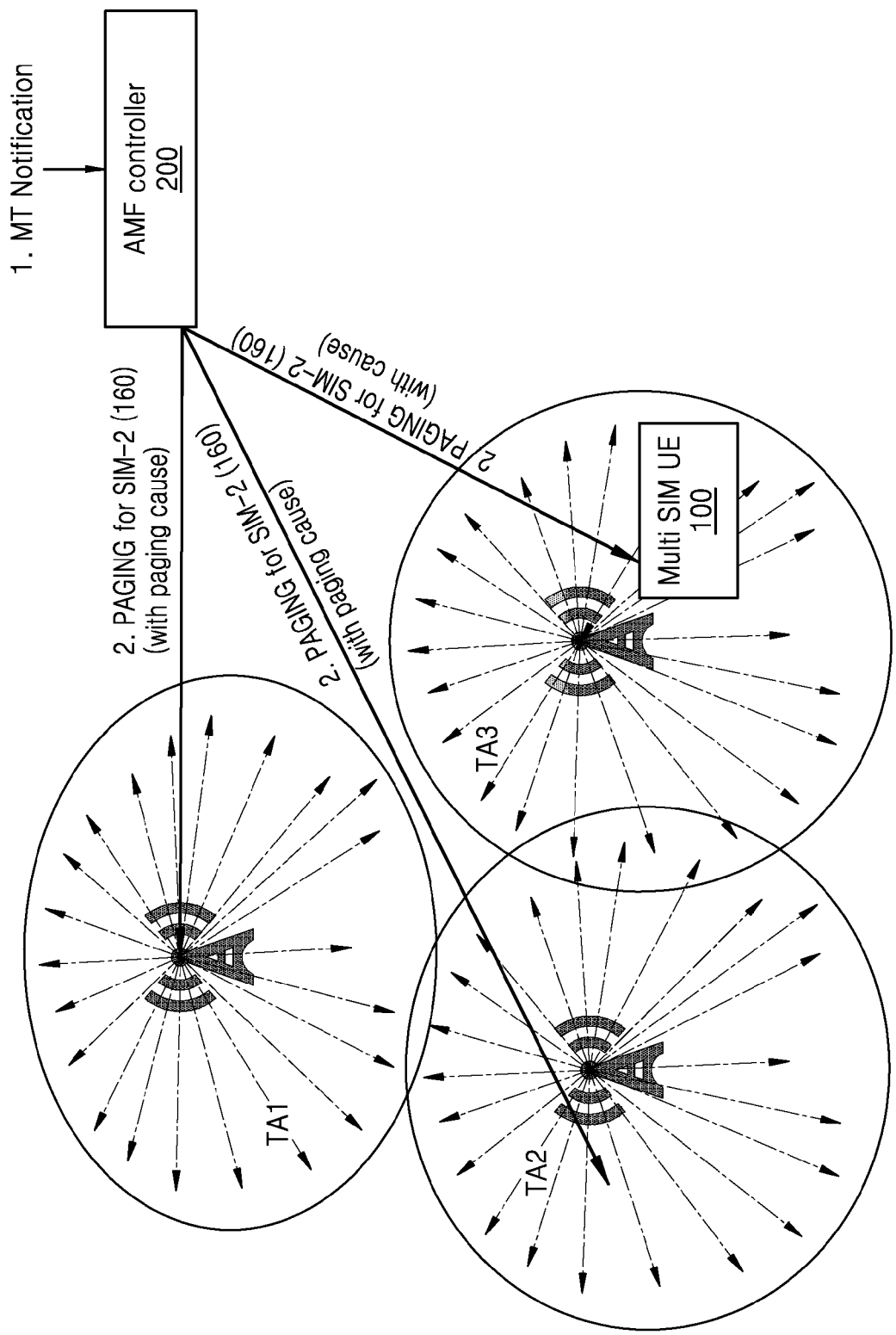

[Fig. 7]
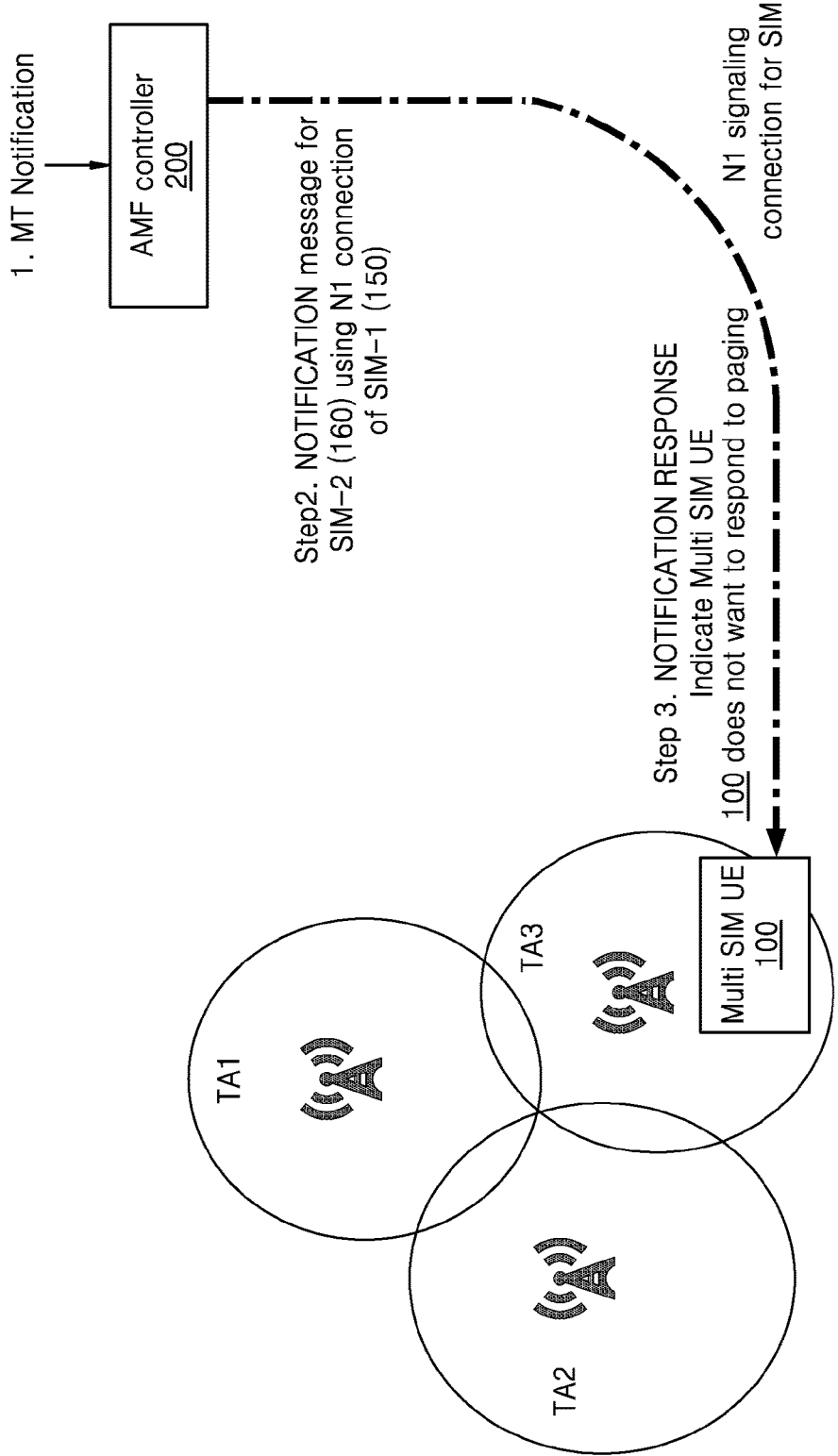

[Fig. 8]

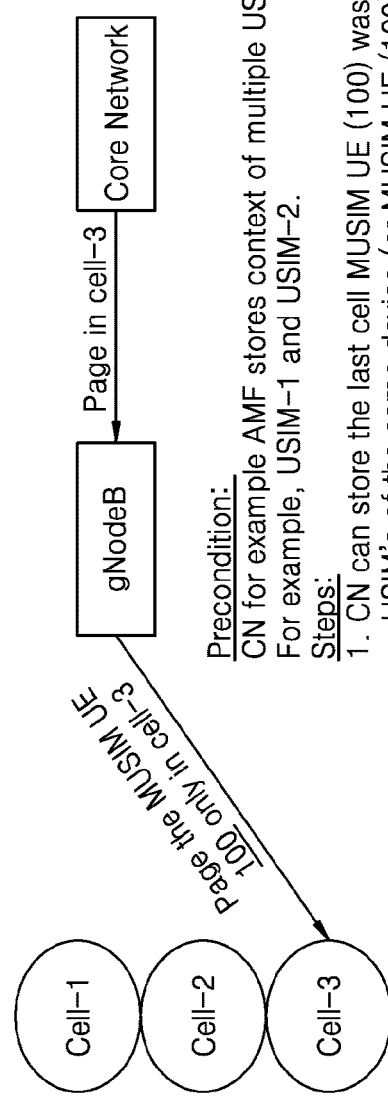

Precondition:
CN for example AMF stores context of multiple USIM's part of a single UE.
For example, USIM-1 and USIM-2.
Steps:
1. CN can store the last cell MUSIM UE (100) was in connected mode over one of the USIM's of the same device (or MUSIM UE (100)). For example USIM-1.
2. CN receives or generates downlink data or signalling for any of the other USIM's context. CN uses last cell in which one of the USIM's of the same device had contacted the CN for example cell-3.
3. CN decides to page only in cell-3 for its first attempt.

[Fig. 9]

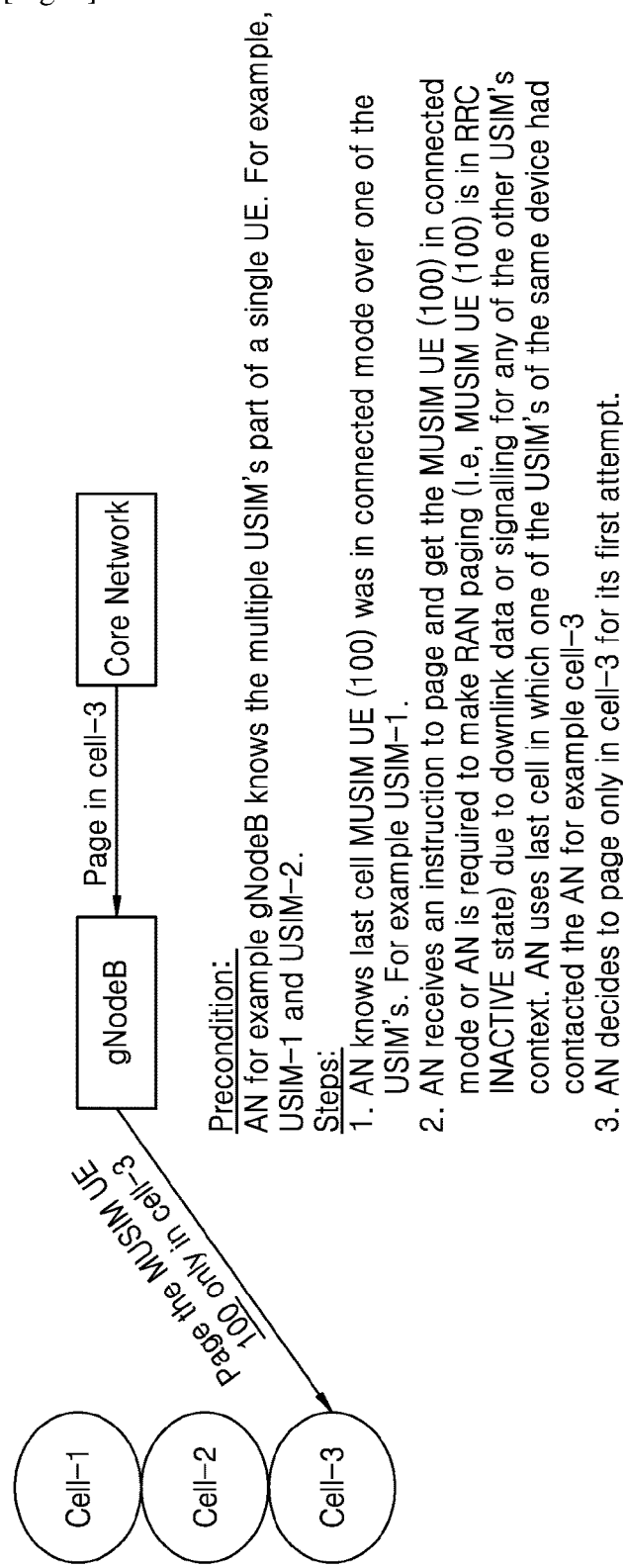

Precondition:
AN for example gNodeB knows the multiple USIM's part of a single UE. For example, USIM-1 and USIM-2.
Steps:
1. AN knows last cell MUSIM UE (100) was in connected mode over one of the USIM's. For example USIM-1.
2. AN receives an instruction to page and get the MUSIM UE (100) in connected mode or AN is required to make RAN paging (I.e, MUSIM UE (100) is in RRC INACTIVE state) due to downlink data or signalling for any of the other USIM's context. AN uses last cell in which one of the USIM's of the same device had contacted the AN for example cell-3
3. AN decides to page only in cell-3 for its first attempt.

[Fig. 10]
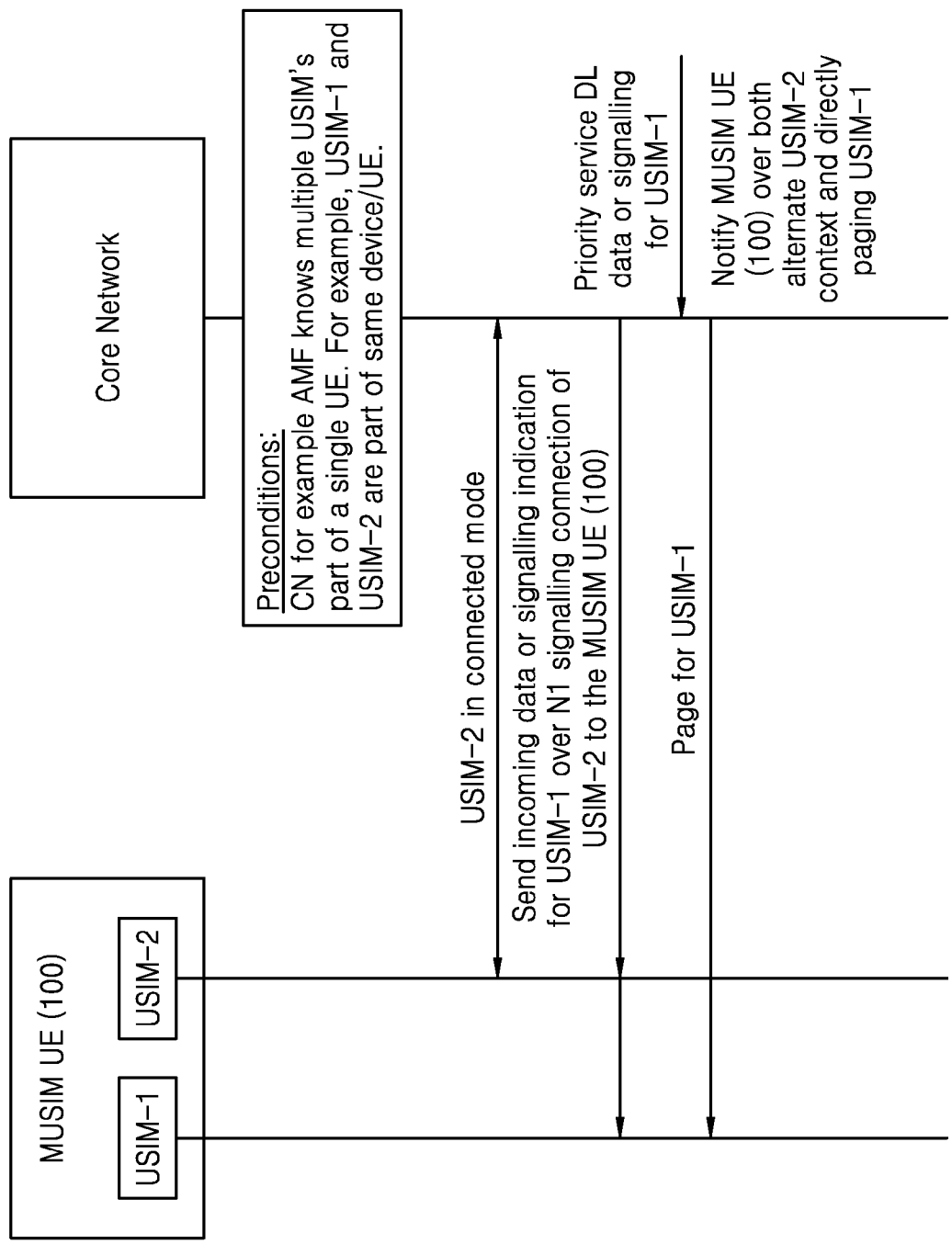

[Fig. 11]
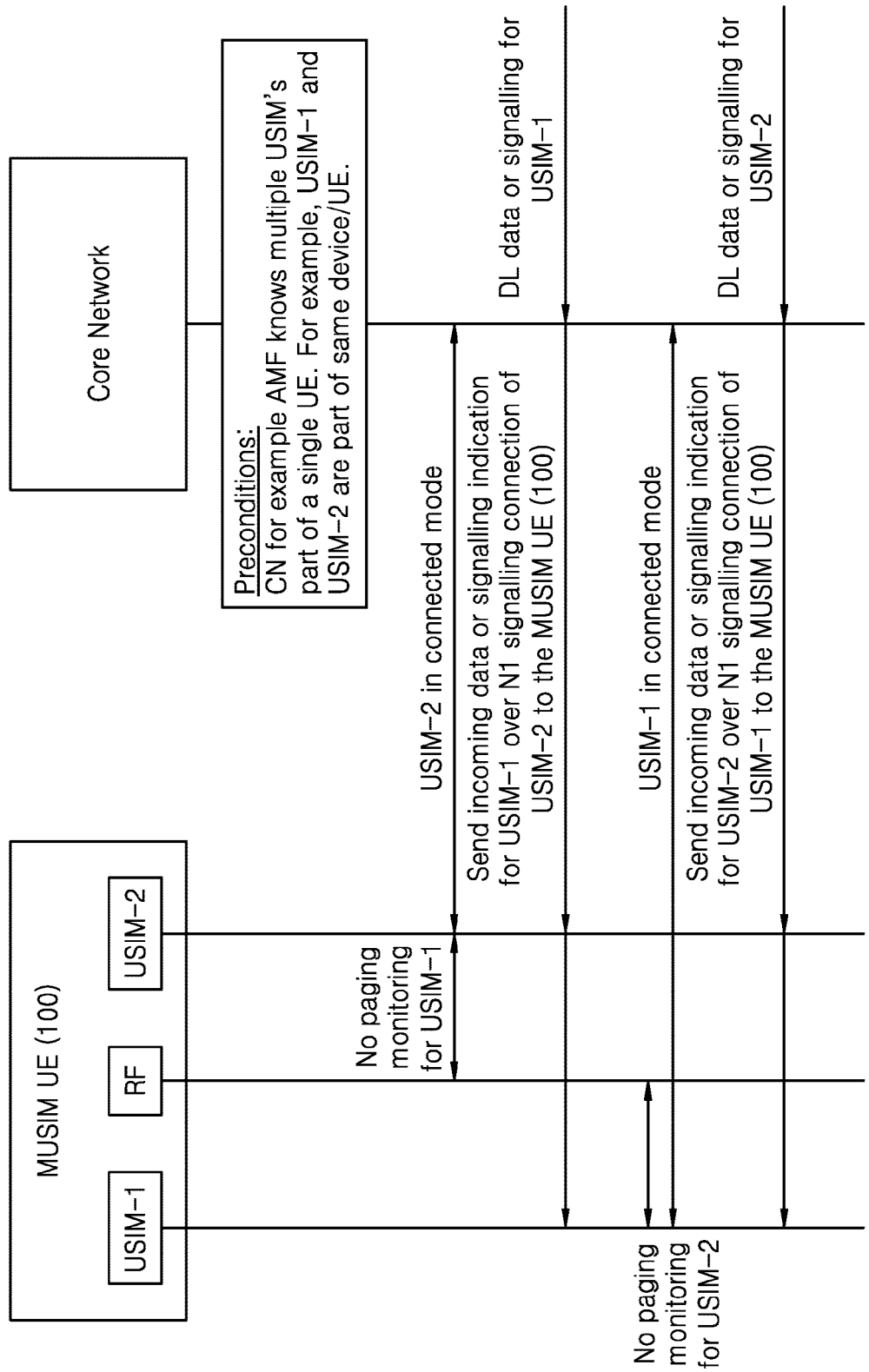

METHOD AND APPARATUS FOR INDICATING MT-SERVICE FOR MULTI-SIM UE

CROSS-REFERENCE TO RELATED APPLICATIONS

This application is a 371 of International Application No. PCT/KR2020/008003 filed on Jun. 19, 2020, which claims priority to India Patent Application No. 201941024752 filed on Jun. 21, 2019, India Patent Application No. 201941032745 filed on Aug. 13, 2019, and India Patent Application No. 201941024752 filed on Jun. 18, 2020, the disclosures of which are herein incorporated by reference in their entirety.

BACKGROUND

1. Field

The present disclosure relates to wireless communication, and more particularly, the present disclosure relates to method and apparatus for indicating mobile terminated (MT)-service for multi-SIM UE in wireless communication network.

2. Description of Related Art

To meet the demand due to ever-increasing wireless data traffic after the commercialization of the 4th generation (4G) communication system, there have been efforts to develop an advanced 5th generation (5G) system or pre-5G communication system. For this reason, the 5G or pre-5G communication system is also called a beyond 4th-generation (4G) network communication system or post long term evolution (LTE) system. Implementation of the 5G communication system using ultra-frequency millimeter wave (mmWave) bands, e.g., 60 giga hertz (GHz) bands, is considered to attain higher data transfer rates. To reduce propagation loss of radio waves and increase a transmission range in the ultra-frequency bands, beamforming, massive multiple-input multiple-output (MIMO), Full Dimensional MIMO (FD-MIMO), array antenna, analog beamforming, and large-scale antenna techniques are under discussion. To improve system networks, technologies for advanced small cells, cloud Radio Access Networks (RANs), ultra-dense networks, device to device (D2D) communication, wireless backhaul, moving networks, cooperative communication, Coordinated Multi-Points (CoMP), reception-end interference cancellation and the like are also being developed in the 5G communication system. In addition, in the 5G system, an advanced coding modulation (ACM), e.g., hybrid frequency-shift keying (FSK) and quadrature amplitude modulation (QAM) (FQAM), sliding window superposition coding (SWSC), and an advanced access technology, e.g., filter bank multi carrier (FBMC), non-orthogonal multiple access (NOMA), and sparse code multiple access (SCMA), are being developed.

In the meantime, the Internet is evolving from a human-centered connectivity network where humans generate and consume information into an Internet of Things (IoT) network where distributed entities such as things transmit, receive and process information without human intervention. Internet of Everything (IoE) technologies combined with IoT, such as big data processing technologies through connection with a cloud server, for example, have also emerged. To implement IoT, various technologies, such as a sensing technology, a wired/wireless communication and network infrastructure, a service interfacing technology, and a security technology are required, and recently, even technologies for sensor network, Machine to Machine (M2M), Machine Type Communication (MTC) for connection between things are being studied. Such an IoT environment may provide intelligent Internet Technology (IT) services that generate a new value to human life by collecting and analyzing data generated among connected things. IoT may be applied to a variety of areas, such as smart homes, smart buildings, smart cities, smart cars or connected cars, smart grids, health care, smart home appliances and advanced medical services through convergence and combination between existing Information Technologies (IT) and various industrial applications.

In this regard, various attempts to apply the 5G communication system to the IoT network are being made. For example, technologies regarding a sensor network, M2M, MTC, etc., are implemented by the 5G communication technologies, such as beamforming, MIMO, array antenna schemes, etc. Even application of a cloud Radio Access Network (cloud RAN) as the aforementioned big data processing technology may be viewed as an example of convergence of 5G and IoT technologies.

Generally, with advancement in technology, multi-subscriber identity module (SIM) user equipments (UEs) are widely in use. A multi-SIM UE such as a dual SIM UE comprises a first SIM and a second SIM. Consider the first SIM and the second SIM are camped with a same Public Land Mobile Network (PLMN). However, core network and Access and Mobility Management Function (AMF) of the PLMN are unaware that both the first SIM and the second SIM which are camped with the PLMN belong to the same dual SIM UE. Therefore, even if a first SIM context is in CONNECTED mode with the PLMN, the AMF will page the multi-SIM UE resulting in wastage of paging resources.

In an embodiment, the multi-SIM UE can be a multi UMTS subscriber identity module (MUSIM) UE capable of supporting multiple USIMs. For paging only in specific cells, consider the MUSIM UE capable is registered on the same PLMN i.e. with the same AMF. A USIM-1 is in connected mode. A core network (CN) receives downlink data for a USIM-2. The core network pages the MUSIM UE for USIM-2 following an existing paging strategy. For example, according to one of the paging strategies, CN will page the MUSIM UE in all possible cells of a registered area. The CN does not take into account a current state or last contacted cell details of the USIM-1 context to decide which area to be paged for the USIM-2 leading to paging resource wastage.

Consider paging on both paths—alternate USIM's N1 signaling connection and paging, for critical services like an emergency, mission-critical etc. When downlink (DL) data or signaling is received, the network will notify or page the MUSIM UE in one of the below possible ways of reaching the MUSIM UE:

Directly paging the target MUSIM UE for which DL signaling or data is pending—or, Notifying on NAS signaling connection of alternate USIM which resides over the same device or MUSIM UE.

Due to an abnormal situation in the chosen path if the MUSIM UE is not reached then it can create a delay in reaching the MUSIM UE and hence critical service can get impacted.

Consider a scenario of the MUSIM UE not switching RF between multiple USIMs, Consider the MUSIM UE with a subset of the USIMs which are registered with the same PLMN i.e. the same AMF. However, the MUSIM UE monitors the paging channel (i.e. paging occasion or paging opportunity) for all the USIMs which are in IDLE mode. This step consumes battery and also can create paging collision issues.

Thus, it is desired to address the above mentioned disadvantages or other shortcomings or at least provide a useful alternative.

SUMMARY

The present disclosure relates to a method for indicating mobile terminated (MT)-service for a multi-subscriber identity module (SIM) user equipment (UE) in a wireless communication network.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which:

FIG. 1A is a block diagram of an AMF controller (200) for indicating mobile terminated (MT)-service for a multi-SIM UE (100) in a wireless communication network, according to the embodiments as disclosed herein;

FIG. 1B is a block diagram of the multi-SIM UE (100) for indicating the MT-service in the wireless communication network, according to the embodiments as disclosed herein;

FIG. 2A is a flow chart illustrating a method for indicating the MT service to the multi-SIM UE (100) in the wireless communication network, according to the embodiments as disclosed herein;

FIG. 2B is a flowchart illustrating a method for providing a response by the multi-SIM UE (100) to the indication of the MT-service in the wireless communication network, according to the embodiments as disclosed herein;

FIG. 3 illustrates a scenario of wastage of paging resources in the wireless communication network, according to the prior art;

FIG. 4 illustrates a scenario of paging by the AMF controller (200) when a first SIM (150) of the multi-SIM UE (100) is in N1 connected mode, according to the prior art;

FIG. 5 illustrates a method for initiating the MT services to the multi-SIM UE (100) in the wireless communication network, according to the embodiments as disclosed herein;

FIG. 6 illustrates a scenario where a second SIM (160) neglects paging messages from the wireless communication network when the first SIM (150) of the multi-SIM UE (100) is in the N1 connected mode, according to the prior art; and FIG. 7 illustrates a scenario a method for managing paging where the second SIM (160) neglects the paging messages from the wireless communication network when the first SIM (150) of the multi-SIM UE (100) is in the N1 connected mode, according to an embodiment as disclosed herein;

FIG. 8 illustrates a core network solution for paging only in specific cells, according to an embodiment as disclosed herein;

FIG. 9 illustrates an access network solution for paging strategy based on one of the USIM(s) mobility behavior residing on the MUSIM UE (100), according to an embodiment as disclosed herein;

FIG. 10 illustrates a method and system for paging on both alternate USIM's N1 signaling connection and the paging, according to an embodiment as disclosed herein; and FIG. 11 illustrates a method for addressing a scenario when the MUSIM UE (100) is not switching the RF between multiple USIMs, according to an embodiment as disclosed herein.

DETAILED DESCRIPTION

Accordingly the embodiments herein disclose a method for indicating mobile terminated (MT)-service for a multi-subscriber identity module (SIM) user equipment (UE) (100) in a wireless communication network. The method includes registering, by an access and mobility management function (AMF) controller (200) in the wireless communication network, a first SIM (150) based on a first registration request message and a second SIM (160) based on a second registration request message. The second SIM (160) of the multi-SIM UE (100) is registered with the same AMF controller (200) with which the first SIM (150) of the multi-SIM UE (100) is registered by providing a globally unique temporary identifier (GUTI) for the first SIM (150) in the second registration request message. Further, the method includes identifying, by the AMF controller (200), that the first SIM (150) and the second SIM (160) are part of the same multi-SIM UE (100); receiving, by the AMF controller (200), at least one of downlink data and signaling information for the second SIM (160) of the multi-SIM UE (100) when a N1 Non-access stratum (NAS) is in Connection Management-Connected (CM-Connected) state for the first SIM (150); and sending, by the AMF controller (200), a NAS message indicating at least one of the downlink data and the signaling for the second SIM (160) of the multi-SIM UE (100) over the N1 NAS connection of the first SIM (150).

In an embodiment, the method further includes receiving, by the multi-SIM UE (100), the NAS message indicating at least one of the downlink data and the signaling for the second SIM (160) of the multi-SIM UE (100) over the N1 NAS connection of the first SIM (150). The NAS message includes a MT cause. Further, the method includes determining, by the multi-SIM UE (100), whether the multi-SIM UE (100) intends to respond to the NAS message based on the MT cause; and performing, by the multi-SIM UE (100), one of: triggering a service request for the second SIM (160) with the AMF controller (200) and moving to a connected mode over the second SIM (160), in response to determining that the multi-SIM UE (100) intends to respond to the NAS message based on the MT cause, and sending a response message to the AMF controller (200) over the N1 NAS connection of the first SIM (150) indicating that the multi-SIM UE (100) is not intending to respond to the NAS message for example service request message or registration request message for the second SIM (160), in response to determining that the multi-SIM UE (100) does not intend to respond to the NAS message based on the MT cause.

In an embodiment, registering, by the AMF controller (200), the first SIM (150) of the multi-SIM UE (100) based on the first registration request message includes receiving, by the AMF controller (200), the first registration request message from the first SIM (150) of the multi-SIM UE. Further, the method includes registering, by the AMF controller (200), the first SIM (150) of the multi-SIM UE (100); and sending, by the AMF controller (200), a first registration accept message to the first SIM (150) of the multi-SIM UE (100). The first registration accept message includes the GUTI for the first SIM (150).

In an embodiment, registering, by the AMF controller (200), the second SIM (160) of the multi-SIM UE (100) based on the second registration request message includes receiving, by the AMF controller (200), the second registration request message from the second SIM (160) of the multi-SIM UE (100). The second registration request message includes the GUTI for the first SIM (150) received in the first registration accept message. Further, the method includes registering, by the AMF controller (200), the second SIM (160) of the multi-SIM UE (100) with the AMF controller (200) with which the first SIM (150) is registered based on the GUTI for the first SIM (150) provided in the registration request message; and sending, by the AMF controller (200), a second registration accept message to the second SIM (160) of the multi-SIM UE (100).

Accordingly the embodiments herein disclose a method for indicating mobile terminated (MT)-service for a multi-SIM UE (100) in a wireless communication network. The method includes receiving, by the multi-SIM UE (100), a NAS message from an AMF controller (200) indicating at least one of downlink data and signaling for a second SIM (160) of the multi-SIM UE (100) over a N1 Non-access stratum (NAS) connection of a first SIM (150). The N1 NAS is in Connection Management-Connected (CM-Connected) state for the first SIM (150). Further, the method includes determining, by the multi-SIM UE (100), whether the multi-SIM UE (100) intends to respond to the NAS message based on a MT cause. The NAS message includes the MT cause; and performing, by the multi-SIM UE (100), one of: triggering a service request for the second SIM (160) with the AMF controller (200) and moving to a connected mode over the second SIM (160), in response to determining that the multi-SIM UE (100) intends to respond to the NAS message based on the MT cause, and sending a response message to the AMF controller (200) over the N1 NAS connection of the first SIM (150) indicating that the multi-SIM UE (100) is not intending to respond to the NAS message for the second SIM (160), in response to determining that the multi-SIM UE (100) does not intend to respond to the NAS message based on the MT cause.

In an embodiment, receiving, by the multi-SIM UE (100), the NAS message from the AMF controller (200) indicating at least one of the downlink data and the signaling information for the second SIM (160) over the N1 NAS connection of the first SIM (150) includes: registering, by the AMF controller (200), the first SIM (150) of the multi-SIM UE (100) based on a first registration request message; registering, by the AMF controller (200), the second SIM (160) of the multi-SIM UE (100) with the AMF controller (200) with which the first SIM (150) of the multi-SIM UE (100) is registered based on a second registration request message. The second registration request message includes a globally unique temporary identifier (GUTI) for the first SIM (150); identifying, by the AMF controller (200), that the first SIM (150) and the second SIM (160) are part of the same multi-SIM UE (100); receiving, by the AMF controller (200), at least one of downlink data and signaling information for the second SIM (160) when a N1 Non-access stratum (NAS) connection is in Connection Management-Connected (CM-Connected) state for the first SIM (150) and CM-IDLE state for the second SIM (160); and sending, by the AMF controller (200), the NAS message indicating at least one of the downlink data and the signaling information for the second SIM (160) of the multi-SIM UE (100) over the N1 NAS connection of the first SIM (150). The NAS message includes the MT cause; and receiving, by the multi-SIM UE (100), the NAS message from the AMF controller (200) indicating at least one of the downlink data and the signaling information for the second SIM (160) over the N1 Non-access stratum (NAS) connection of the first SIM (150). In an embodiment, registering, by the AMF controller (200), the second SIM (160) of the multi-SIM UE (100) based on the second registration request message includes: receiving, by the AMF controller (200), the second registration request message from the second SIM (160) of the multi-SIM UE (100). The second registration request message includes the GUTI for the first SIM (150) received in the first registration accept message; registering, by the AMF controller (200), the second SIM (160) of the multi-SIM UE (100) with the AMF controller (200) with which the first SIM (150) is registered based on the GUTI for the first SIM (150) provided in the second registration request message; and sending, by the AMF controller (200), a second registration accept message to the second SIM (160) of the multi-SIM UE (100).

Accordingly the embodiments herein discloses an AMF controller (200) for indicating mobile terminated (MT)-service for a multi-SIM UE (100) in a wireless communication network. The AMF controller (200) includes a communicator (220), a memory (240), a processor (260) coupled to the memory (240) and the communicator (220); and a NAS management controller (280) coupled to the communicator (220), the memory (240) and the processor (260). The NAS management controller (280) is configured to register a first SIM (150) of the multi-SIM UE (100) based on a first registration request message and register a second SIM (160) of the multi-SIM UE (100) with the AMF controller (200) with which the first SIM (150) of the multi-SIM UE (100) is registered based on a second registration request message. The second registration request message includes a globally unique temporary identifier (GUTI) for the first SIM (150). Further, the NAS management controller (280) is also configured to identify that the first SIM (150) and the second SIM (160) are part of the same multi-SIM UE (100); receive at least one of downlink data and signaling for the second SIM (160) of the multi-SIM UE (100) when a N1 Non-access stratum (NAS) is in Connection Management-Connected (CM-Connected) state for the first SIM (150); and send a NAS message indicating at least one of the downlink data and the signaling for the second SIM (160) of the multi-SIM UE (100) over the N1 NAS connection of the first SIM (150). The NAS message includes a MT cause.

In an embodiment, the NAS management controller (280) is configured to register the second SIM (160) of the multi-SIM UE (100) with the AMF controller (200) with which the first SIM (150) of the multi-SIM UE (100) is registered based on the second registration request message includes: receive the second registration request message from the second SIM (160) of the multi-SIM UE (100). The second registration request message includes the GUTI for the first SIM (150) received in the first registration accept message; register the second SIM (160) of the multi-SIM UE (100) with the AMF controller (200) with which the first SIM (150) is registered based on the GUTI for the first SIM (150) provided in the second registration request message; and send a second registration accept message to the second SIM (160) of the multi-SIM UE (100).

Accordingly the embodiments herein disclose a multi-SIM UE (100) for indicating mobile terminated (MT)-service in a wireless communication network. The multi-SIM UE (100) includes a plurality of SIMS; a communicator (110); a memory (120); a processor (130) coupled to the communicator (110) and the memory (120); and a NAS management controller (140) coupled to the communicator (110), the memory (120) and the processor (130). The NAS management controller (140) is configured to receive a NAS message from an AMF controller (200) indicating at least one of downlink data and signaling for a second SIM (160) of the multi-SIM UE (100) over a N1 Non-access stratum (NAS) connection of a first SIM (150) and determine whether the multi-SIM UE (100) intends to respond to the NAS message based on a MT cause. The NAS message includes the MT cause. The N1 NAS is in Connection Management-Connected (CM-Connected) state for a first SIM (150). Further, the NAS management controller (140) is also configured to perform one of trigger a service request for the second SIM (160) with the AMF controller (200) and moving to a connected mode over the second SIM (160), in response to determining that the multi-SIM UE (100) intends to respond to the NAS message based on the MT cause, and send a response message to the AMF controller (200) over the N1 NAS connection of the first SIM (150) indicating that the multi-SIM UE (100) is not intending to respond to the NAS message for the second SIM (160), in response to determining that the multi-SIM UE (100) does not intend to respond to the NAS message based on the MT cause.

In an embodiment, the first SIM (150) and the second SIM (160) are registered at the same AMF controller (200).

Accordingly the embodiments herein disclose a method for an AMF controller in a wireless communication network, the method including: registering a first SIM of a multi-subscriber identity module (SIM) user equipment (UE) based on a first registration request message; registering a second SIM of the multi-SIM UE based on a second registration request message, wherein the second registration request message comprises a globally unique temporary identifier (GUTI) for the first SIM; identifying that the first SIM and the second SIM are part of the same multi-SIM UE; receiving at least one of downlink data and signaling information for the second SIM when a N1 Non-access stratum (NAS) connection is in Connection Management-Connected (CM-Connected) state for the first SIM and CM-IDLE state for the second SIM; and transmitting a NAS message indicating at least one of the downlink data and the signaling information for the second SIM of the multi-SIM UE over the N1 NAS connection of the first SIM.

Accordingly the embodiments herein disclose a method for a multi-SIM UE in a wireless communication network, the method including: receiving a NAS message from an AMF controller indicating at least one of downlink data and signaling information for a second SIM over a N1 Non-access stratum (NAS) connection of a first SIM, wherein the N1 NAS is in Connection Management-Connected (CM-Connected) state for the first SIM and CM-IDLE state for the second SIM; determining whether the multi-SIM UE intends to respond to the NAS message based on a mobile terminated (MT) cause, wherein the NAS message comprises the MT cause; and performing one of: triggering a service request for the second SIM with the AMF controller and moving to a connected mode over the second SIM, in response to determining that the multi-SIM UE intends to respond to the NAS message based on the MT cause, and transmitting a response message to the AMF controller over the N1 NAS connection of the first SIM indicating that the multi-SIM UE is not intending to respond to the NAS message for the second SIM, in response to determining that the multi-SIM UE does not intend to respond to the NAS message based on the MT cause.

Accordingly the embodiments herein disclose an AMF controller in a wireless communication network, the AMF controller including: at least one processor configured to: register a first SIM of a multi-subscriber identity module (SIM) user equipment (UE) based on a first registration request message; register a second SIM of the multi-SIM UE based on a second registration request message, wherein the second registration request message comprises a globally unique temporary identifier (GUTI) for the first SIM; identify that the first SIM and the second SIM (160) are part of the same multi-SIM UE; receive at least one of downlink data and signaling information for the second SIM when a N1 Non-access stratum (NAS) connection is in Connection Management-Connected (CM-Connected) state for the first SIM and CM-IDLE state for the second SIM; and transmit a NAS message indicating at least one of the downlink data and the signaling information for the second SIM over the N1 NAS connection of the first SIM, wherein the NAS message comprises a mobile terminated (MT) cause.

Accordingly the embodiments herein disclose a multi-SIM UE in a wireless communication network, the multi-SIM UE including: a plurality of SIMs; and at least one processor configured to: receive a NAS message from an AMF controller indicating at least one of downlink data and signaling information for a second SIM over a N1 Non-access stratum (NAS) connection of a first SIM, wherein the N1 NAS is in Connection Management-Connected (CM-Connected) state for a first SIM and CM-IDLE state for the second SIM; determine whether the multi-SIM UE intends to respond to the NAS message based on a mobile terminated (MT) cause, wherein the NAS message comprises the MT cause; and perform one of: trigger a service request for the second SIM with the AMF controller and moving to a connected mode over the second SIM, in response to determining that the multi-SIM UE intends to respond to the NAS message based on the MT cause, and transmit a response message to the AMF controller over the N1 NAS connection of the first SIM indicating that the multi-SIM UE is not intending to respond to the NAS message for the second SIM, in response to determining that the multi-SIM UE does not intend to respond to the NAS message based on the MT cause.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications. The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

The object of the embodiments herein is to register a second SIM of the multi-SIM UE with the same AMF controller with which a first SIM of the multi-SIM UE is registered by providing a globally unique temporary identifier (GUTI) for the first SIM in a second registration request message.

Another object of the embodiments herein is to receive at least one of downlink data and signaling for the second SIM when a N1 Non-access stratum (NAS) is in Connection Management-Connected (CM-Connected) state for the first SIM.

Another object of the embodiments herein is to send a NAS message indicating at least one of the downlink data and the signaling for the second SIM of the multi-SIM UE over the N1 NAS connection of the first SIM.

Another object of the embodiments herein is to determine whether the multi-SIM UE intends to respond to the NAS message based on the MT cause.

Another object of the embodiments herein is to trigger a service request for the second SIM with the AMF controller and move to a connected mode over the second SIM when the multi-SIM UE intends to respond to the NAS message.

Another object of the embodiments herein is to send a response message to the AMF controller over the N1 NAS connection of the first SIM indicating that the multi-SIM UE is not intending to respond to the NAS message for the second SIM when the multi-SIM UE does not intend to respond to the NAS message.

Another object of the embodiments herein is to provide a method and system to multi UMTS subscriber identity module (MUSIM) optimization when the multi-SIM UE is registered with a same operator.

Accordingly the embodiments herein disclose a method for indicating mobile terminated (MT)-service for a multi-subscriber identity module (SIM) user equipment (UE) (100) in a wireless communication network. The method includes registering, by an access and mobility management function (AMF) controller (200) in the wireless communication network, a first SIM (150) based on a first registration request message and a second SIM (160) based on a second registration request message. The second SIM (160) of the multi-SIM UE (100) is registered with the same AMF controller (200) with which the first SIM (150) of the multi-SIM UE (100) is registered by providing a globally unique temporary identifier (GUTI) for the first SIM (150) in the second registration request message. Further, the method includes receiving, by the AMF controller (200), at least one of downlink data and signaling for the second SIM (160) of the multi-SIM UE (100) when a N1 Non-access stratum (NAS) is in Connection Management-Connected (CM-Connected) state for the first SIM (150) and sending, by the AMF controller (200), a NAS message indicating at least one of the downlink data and the signaling for the second SIM (160) of the multi-SIM UE (100) over the N1 NAS connection of the first SIM (150).

Referring now to the drawings and more particularly to FIGS. 1A through 11, where similar reference characters denote corresponding features consistently throughout the figure, these are shown preferred embodiments.

FIG. 1A is a block diagram of an AMF controller (200) for indicating mobile terminated (MT)-service for a multi-SIM UE (100) in a wireless communication network, according to the embodiments as disclosed herein.

Consider a wireless communication network comprising the multi-SIM UE (100) and the AMF controller (200) at the wireless communication network end. Consider that the multi-SIM UE (100) comprises two SIMS i.e., a first SIM (150) and a second SIM (160). In general, in the perspective of the multi-SIM UE (100), the first SIM (150) and the second SIM (160) belong to a same device. However, in the perspective of the wireless communication network the first SIM (150) and the second SIM (160) are considered as two separate user equipments (UEs). Therefore, the term first SIM (150) refers to a first UE comprising a first wireless protocol stack, the first SIM (150) card and a portion of an application layer. Similarly, the term second SIM (160) refers to a second UE comprising a second wireless protocol stack, the second SIM (160) card and a remaining portion of the application layer. Therefore, in the perspective of the wireless communication network the first SIM (150) can be referred to as the first UE (150) and the second SIM (160) can be referred to as the second UE (160).

Referring to the FIG. 1A, the AMF controller (200) resides at the network side and includes a communicator (220), a memory (240), a processor (260) and a NAS management controller (280). Throughout the specification the terms AMF controller (200) and AMF may be used interchangeable.

In an embodiment, the communicator (220) is configured to enable communication between the various hardware elements of the AMF controller (200).

The memory (240) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (240) may, in some examples, be considered a non-transitory storage medium. The term "non-transitory" may indicate that the storage medium is not embodied in a carrier wave or a propagated signal. However, the term "non-transitory" should not be interpreted that the memory (240) is non-movable. In some examples, the memory (240) is configured to store larger amounts of information than the memory. In certain examples, a non-transitory storage medium may store data that can, over time, change (e.g., in Random Access Memory (RAM) or cache).

In an embodiment, the processor (260) is configured to execute various instructions stored in the memory (240).

In an embodiment, the NAS management controller (280) is configured to receive the first registration request message from the first SIM (150) of the multi-SIM UE (100) and register the first SIM (150) of the multi-SIM UE (100). Further, the NAS management controller (280) is also configured to send a first registration accept message to the first SIM (150) of the multi-SIM UE (100) with a temporary identifier such as a globally unique temporary identifier (GUTI) for the first SIM (150).

The NAS management controller (280) is configured to receive the second registration request message from the second SIM (160) of the multi-SIM UE (100) with the GUTI for the first SIM (150) received in the first registration accept message. Therefore, the inclusion of the GUTI for the first SIM (150) in the second registration request message enables the NAS management controller (280) to register the second SIM (160) with the same AMF controller (200) with which the first SIM (150) is registered. Further, the NAS management controller (280) is configured to send a second registration accept message to the second SIM (160) of the multi-SIM UE (100). The NAS management controller (280) can manage a UE context of both the first SIM (150) and second SIM (160) as related to same subscriber using a subscriber ID.

Further, the NAS management controller (280) is also configured to receive at least one of downlink data and signaling for the second SIM (160) of the multi-SIM UE (100) such as a mobile terminated call. However, a N1 Non-access stratum (NAS) connection is in Connection Management-Connected (CM-Connected) state for the first SIM (150) of the multi-SIM UE (100) and the AMF controller (200). Therefore, the NAS management controller (280) uses the N1 NAS connection of the first SIM (150) and sends a NAS message indicating at least one of the downlink data and the signaling for the second SIM (160) of the multi-SIM UE (100). The NAS message includes a mobile terminated (MT) cause which indicates the reason for which the AMF controller (200) is paging the second SIM (160). Therefore, the need for paging the second SIM (160) when the N1 NAS connection is active for the first SIM (150) which conventionally leads to the wastage of the paging resources is eliminated.

In an embodiment, the AMF can send NAS message (for second SIM (160)) to the multi-SIM UE (100) using N1 NAS signaling connection of first SIM (150). The NAS N1 signaling connection of first SIM (150) can be over 3GPP access or non-3GPP access.

In an embodiment, the AMF can send NAS message (for one of the subscription i.e. SIM stack) to the multi-SIM UE (100) using N1 NAS signaling connection of any of the subscription if multiple USIM's are registered to the same AMF. If at least one of the subscription's MM context's N1 NAS signaling connection is established (i.e. it's in connected mode) it can be used or otherwise the AMF can page for one of the subscription and once AMF gets into connected mode for that subscription, the AMF can send the NOTIFICATION message for all other subscriptions too for which there is a downlink (DL) signaling or data.

In yet another embodiment instead of sending NOTIFICATION message (which indicates there is a pending downlink data or signaling), the AMF or g-NodeB can send actual NAS or AS signaling message (for example SMS message) or data messages to the multi-SIM UE (100). In general any NAS message of one subscription information can be sent over the existing NAS N1 signaling connection of some other subscription.

In another embodiment, same PLMN can be same HPLMN or same VPLMN. The multi-SIM UE (100) can camp on same PLMN for all the USIM's (in MUSIM case) or subset of USIM's UE is holding. This subset of USIM's registering for the same PLMN can avail the optimizations proposed in the method/application.

The AMF or the multi-SIM UE (100) can indicate to the g-NodeB that the multi-SIM UE (100) is registering to same operator. The g-NodeB can also apply same optimization depending on which USIM is in connected mode. Due to both the SIMS being registered to the same operator, the g-Node B can avoid paging for other subscriptions and can send unicast RRC message to the USIM subscription for which there is a RRC connection already existing. The RRC message can act as a paging message in the multi-SIM UE (100), AS layer will indicate paging received to the NAS layer.

The proposed method is described with respect to fifth generation (5G) systems in mind. But the proposed method is also applicable to fourth generation (4G) systems too. However, N1 interface will be replaced with Si interface and AMF will be replaced with MME for 4G systems.

When the multi-SIM UE (100) moves from the 4G to the 5G or vice versa, the AMF/MME shall indicate to corresponding target node (like AMF or MME) which all subscriptions belong to same multi-SIM UE (100) so that the optimizations and solutions of the proposed method are applicable.

In the proposed method, its assumed that the AMF or the g-NodeB will send the NAS or the AS message for the second SIM (160) over NAS N1 signaling connection of the first SIM (150) if the multi-SIM UE (100) is in connected mode for the second SIM (160). However, the proposed method is also applicable if the second SIM (160) is in IDLE mode or INACTIVE state. Subscription in the proposed method means the MM context related to one particular SIM using which NAS signaling connection is established between the multi-SIM UE (100) and the AMF.

The NAS message or AS message are Notification message/Notification response using which the information can be exchanged between the multi-SIM UE (100) and the AMF or the multi-SIM UE (100) and the g-NodeB.

Although the FIG. 1A shows the hardware elements of the AMF controller (200) but it is to be understood that other embodiments are not limited thereon. In other embodiments, the AMF controller (200) may include less or more number of elements. Further, the labels or names of the elements are used only for illustrative purpose and does not limit the scope of the invention. One or more components can be combined together to perform same or substantially similar function.

FIG. 1B is a block diagram of a multi-SIM UE (100) for indicating the mobile terminated (MT)-service in the wireless communication network, according to the embodiments as disclosed herein.

Referring to the FIG. 1B, the multi-SIM UE (100) is for example a mobile phone, a smart phone, Personal Digital Assistant (PDA), a tablet, a wearable device, or the like. The multi-SIM UE (100) includes a communicator (110), a memory (120), a processor (130), a NAS management controller (140), the first SIM (150) and the second SIM (160).

In an embodiment, the communicator (110) is configured to enable communication between the various hardware elements of the multi-SIM UE (100).

The memory (120) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) is configured to store larger amounts of information than the memory. In certain examples, a non-transitory storage medium may store data that can, over time, change (e.g., in Random Access Memory (RAM) or cache).

In an embodiment, the processor (130) is configured to execute various instructions stored in the memory (120).

In an embodiment, the NAS management controller (140) is configured to send the first registration request message to the AMF controller (200) for registering the first SIM (150) with the AMF controller (200) and receive the first registration response message from the AMF controller (200) after the first SIM (150) is registered with the AMF controller (200). The NAS management controller (140) also determines the GUTI for the first SIM (150) provided by the AMF controller (200). Further, the NAS management controller (140) is configured to send the second registration request message to the AMF controller (200) for registering the second SIM (160) with the AMF controller (200). While sending the second registration request message, the NAS management controller (140) embeds the GUTI for the first SIM (150) into the second registration request message. The second SIM (160) stack also should use the information from the first SIM (150) MM context (for example GUTI received in the first SIM (150) MM context) for routing in the RRC message so that the second registration request message sent for the second SIM (160) also reaches the same AMF controller (200) as that of the first SIM (150). In general after registration of the multi-SIM UE (100) for the first SIM (150), the multi-SIM UE (100) should provide information (for example GUTI of first SIM) to the RAN node like the g-nodeB (over RRC signaling) such that the NAS message for the second SIM (160) is also routed to the same AMF controller (200) with which the multi-SIM UE (100) is registered for the first SIM (150).

If the multi-SIM UE (100) already has the GUTI for the second SIM (160) then the multi-SIM UE (100) can indicate the GUTI of first SIM (150) as part of the second registration message of the second SIM (160) so that if the second registration request message is routed to some other AMF the second MM CONTEXT or the second registration request message can be re-routed to common AMF controller (200) between the MM contexts of both the subscriptions.

Further, the multi-SIM UE (100) or the AMF controller (200) identifies that both the first SIM (150) and the second SIM (160) are attached to same PLMN (i.e., same HPLMN or same VPLMN). The multi-SIM UE (100) can identify so by comparing a currently registered PLMN for one subscription (first SIM (150)) when compared to the PLMN on which the multi-SIM UE (100) is trying to register for another subscription (second SIM (160)).

The AMF controller (200) or g-NodeB can identify that both the first SIM (150) context and the second SIM (160) context belong to the same the multi-SIM UE (100):

By an indication from the multi-SIM UE (100) during the registration procedure. For example, when the multi-SIM UE (100) is trying to register the second SIM (160) the multi-SIM UE (100) can provide the GUTI (or some other identifiable parameter of individual SIM for example from MM context) of the first SIM (150) which is already registered. Indication of the same operator can also go over both registration request (in general any NAS message) message of individual SIM's.

The multi-SIM UE (100) can provide information to the network based on HPLMN configuration in the SIM. If both the PLMN are the same between two SIMs then the multi-SIM UE (100) can indicate to the network.

The network itself can store all the related SUPI's or IMSI's mapped to a common subscriber. Thus during registration, the network can map all the context to the same subscriber or the multi-SIM UE (100).

The network can identify that both the SIMs belong to the same multi-SIM UE (100) from IMEI(s) information provided by the multi-SIM UE (100) i.e. multi-SIM UE (100) can send one or multiple IMEI.

The network can identify that both the SIM's belong to the same multi-SIM UE (100) from the IMEI(s) information stored in the network.

Once the AMF knows that the SIMS belongs to the device (i.e. multi-SIM UE (100)) then the AMF will send the NAS notification message for the SIM in IDLE mode, instead of executing broadcast paging procedure, to indicate to the UE that MT service is pending (whenever MT signaling or MT data is pending for that SIM) over the NAS N1 signaling connection of another SIM which is in connected mode.

In an embodiment, the NAS management controller (140) is configured to receive the NAS message from the AMF controller (200) of the network end indicating at least one of downlink data and signaling for the second SIM (160) of the multi-SIM UE (100) over the N1 NAS connection of the first SIM (150). Further, the NAS management controller (140) is configured to determine whether the multi-SIM UE (100) intends to respond to the NAS message based on the MT cause provided in the NAS message. The N1 NAS is in the CM-Connected state for the first SIM (150). Further, the NAS management controller (140) is also configured to trigger a service request for the second SIM (160) with the AMF controller (200) and move to a connected mode over the second SIM (160) on determining that the multi-SIM UE (100) intends to respond to the NAS message based on the MT cause. The NAS management controller (140) is also configured to send a response message to the AMF controller (200) over the N1 NAS connection of the first SIM (150) indicating that the multi-SIM UE (100) is not intending to respond to the NAS message for the second SIM (160) on determining that the multi-SIM UE (100) does not intend to respond to the NAS message based on the MT cause.

Further, the multi-SIM UE (100) and the network can negotiate (as part of NAS or AS signaling) if the features discussed in the proposed method are supported or not. Only if both the entities support, the features are expected to be executed. i.e when the multi-SIM UE (100) indicates to the network that second SIM (160) is also part of the same multi-SIM UE (100) by providing an indication (for example GUTI of first SIM (150)) then the network will indicate to the multi-SIM UE (100) that the solution of sending the NAS notification over the N1 NAS signaling connection of the first SIM (150) can be sent over the second SIM (160) is accepted or not accepted i.e. the solution discussed in this invention. Only if it's accepted then the multi-SIM UE (100) expects to receive the NAS notification message of other SIMs over the NAS N1 signaling connection of the SIM which is in cm-connected state.

The proposed method is described with respect to the PLMN being the same for both the first SIM (150) and the second SIM (160). However, the proposed method can be extended for the cases between RPLMN and EPLMN. I.e. one SIM is camped on RPLMN and another is camped on EPLMN.

HPLMN and EHPLMN. I.e. one SIM is camped on HPLMN and another is camped on EHPLMN case.

If the network is same between Dual SIMS if the call is ongoing on the first SIM (150) then network (AMF or g-NodeB) can avoid paging the multi-SIM UE (100) for the second SIM (160). In general, the multi-SIM UE (100) can negotiate with the network for which "X" services the multi-SIM UE (100) is required to page on the first SIM (150) when which Y services are ongoing on the second SIM (160). In other cases, the network will not page the multi-SIM UE (100). Alternatively, the multi-SIM UE (100) can indicate which services the multi-SIM UE (100) will respond as part of response message.

The multi-SIM UE (100) when moves from an IDLE (or INACTIVE state) to CONNECTED mode for the SIM-1, the multi-SIM UE (100) can indicate to the network if the multi-SIM UE (100) will accept the paging (or NOTIFICATION) message for other SIM context. The multi-SIM UE (100) can also indicate which partial services the multi-SIM UE (100) will react for paging, using this information network can avoid paging (or sending MT NOTIFICATIONS) the multi-SIM UE (100) for rest of the services.

Only dual SIM case is discussed but the proposed method is applicable to Multi USIM case too.

Although the FIG. 1B shows the hardware elements of the multi-SIM UE (100) but it is to be understood that other embodiments are not limited thereon. In other embodiments, the multi-SIM UE (100) may include less or more number of elements. Further, the labels or names of the elements are used only for illustrative purpose and does not limit the scope of the invention. One or more components can be combined together to perform same or substantially similar function.

FIG. 2A is a flow chart illustrating a method for indicating the MT service to the multi-SIM UE (100) in the wireless communication network, according to the embodiments as disclosed herein.

Referring to the FIG. 2A, at step 202, the AMF controller (200) receives the first registration request message from the first SIM (150) of the multi-SIM UE (100). For example, in the AMF controller (200) illustrated in the FIG. 1A, the NAS management controller (280) is configured to receive the first registration request message from the first SIM (150) of the multi-SIM UE (100).

At step 204, the AMF controller (200) registers the first SIM (150) of the multi-SIM UE (100). For example, in the AMF controller (200) illustrated in the FIG. 1A, the NAS management controller (280) is configured to register the first SIM (150) of the multi-SIM UE (100).

At step 206, the AMF controller (200) sends the first registration accept message to the first SIM (150) of the multi-SIM UE (100). For example, in the AMF controller (200) illustrated in the FIG. 1A, the NAS management controller (280) is configured to send the first registration accept message to the first SIM (150) of the multi-SIM UE (100).

At step 208, the AMF controller (200) receives the second registration request message from the second SIM (160) of the multi-SIM UE (100). For example, in the AMF controller (200) illustrated in the FIG. 1A, the NAS management controller (280) is configured to receive the second registration request message from the second SIM (160) of the multi-SIM UE (100).

At step 210, the AMF controller (200) registers the second SIM (160) of multi-SIM UE (100) with AMF controller (200) with which first SIM (150) is registered based on GUTI for first SIM (150) provided in second registration request message. For example, in the AMF controller (200) illustrated in the FIG. 1A, the NAS management controller (280) is configured to register the second SIM (160) of multi-SIM UE (100) with AMF controller (200) with which first SIM (150) is registered based on GUTI for first SIM (150) provided in second registration request message.

At step 212, the AMF controller (200) sends the second registration accept message to the second SIM (160) of the multi-SIM UE (100). For example, in the AMF controller (200) illustrated in the FIG. 1A, the NAS management controller (280) is configured to send the second registration accept message to the second SIM (160) of the multi-SIM UE (100).

At step 214, the AMF controller (200) receives at least one of the downlink data and the signaling for the second SIM (160) of multi-SIM UE (100) when N1 NAS is in the CM-Connected state for the first SIM (150). For example, in the AMF controller (200) illustrated in the FIG. 1A, the NAS management controller (280) is configured to receive at least one of the downlink data and the signaling for the second SIM (160) of multi-SIM UE (100) when N1 NAS is in the CM-Connected state for the first SIM (150).

At step 216, the AMF controller (200) sends the NAS message indicating at least one of downlink data and signaling for second SIM (160) of multi-SIM UE (100) over N1 NAS connection of first SIM (150). For example, in the AMF controller (200) illustrated in the FIG. 1A, the NAS management controller (280) is configured to send the NAS message indicating at least one of downlink data and signaling for second SIM (160) which is IDLE mode of multi-SIM UE (100) over N1 NAS connection of first SIM (150) which is in connected mode. The vice versa case is also possible the NAS management controller (280) is configured to send the NAS message indicating at least one of downlink data and signaling for first SIM (160) which is IDLE mode of multi-SIM UE (100) over N1 NAS connection of second SIM (150) which is in connected mode.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

FIG. 2B is a flowchart illustrating a method for providing the response by the multi-SIM UE (100) to the indication of the MT-service in the wireless communication network, according to the embodiments as disclosed herein.

Referring to the FIG. 2B, at step 222, the multi-SIM UE (100) receives the NAS message from the AMF controller (200) indicating at least one of downlink data and signaling for the second SIM (160) of the multi-SIM UE (100) over the N1 Non-access stratum (NAS) connection of the first SIM (150). For example, in the multi-SIM UE (100) illustrated in the FIG. 1B, the NAS management controller (140) is configured to receive the NAS message from the AMF controller (200) indicating at least one of downlink data and signaling for the second SIM (160) of the multi-SIM UE (100) over the N1 Non-access stratum (NAS) connection of the first SIM (150).

At step 224, the multi-SIM UE (100) determines whether the multi-SIM UE (100) intends to respond to the NAS message based on the MT cause. The MT cause indicates to the UE the type of downlink traffic pending for that SIM for example like Paging cause, PDU session ID, QOS, QCI, Slice ID. For example, in the multi-SIM UE (100) illustrated in the FIG. 1B, the NAS management controller (140) is configured to determine whether the multi-SIM UE (100) intends to respond to the NAS message based on the MT cause.

On determining that the multi-SIM UE (100) intends to respond to the NAS message based on the MT cause, at step 226, the multi-SIM UE triggers the service request for the second SIM (160) with the AMF controller (200) and moving to the connected mode over the second SIM (160). For example, in the multi-SIM UE (100) illustrated in the FIG. 1B, the NAS management controller (140) is configured to triggers the service request for the second SIM (160) with the AMF controller (200) and moving to the connected mode over the second SIM (160), on determining that the multi-SIM UE (100) intends to respond to the NAS message based on the MT cause.

On determining that the multi-SIM UE (100) does not intend to respond to the NAS message based on the MT cause, at step 228, the multi-SIM UE sends the response message to the AMF controller (200) over the N1 NAS connection of the first SIM (150) indicating that the multi-SIM UE (100) is not intending to respond to the NAS message for the second SIM (160). For example, in the multi-SIM UE (100) illustrated in the FIG. 1B, the NAS management controller (140) is configured to send the response message to the AMF controller (200) over the N1 NAS connection of the first SIM (150) indicating that the multi-SIM UE (100) is not intending to respond to the NAS message for the second SIM (160), on determining that the multi-SIM UE (100) does not intend to respond to the NAS message based on the MT cause.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

FIG. 3 illustrates a scenario of wastage of the paging resources in the wireless communication network, according to the prior art.

Referring to the FIG. 3, consider the multi-SIM UE (100) comprising a first subscription (i.e., first SIM (150)) and a second subscription (i.e., second SIM (160)). Consider that the first SIM (150) and the second SIM (160) are camped with the same PLMN. However, the core network and the AMF controller (200) of the PLMN are unaware that both the first SIM (150) and the second SIM (160) which are camped with the PLMN belong to the same multi-SIM UE (100).

Therefore, even if the first SIM (150) context is in CONNECTED mode with the PLMN, the AMF controller (200) will page the multi-SIM UE (100) for MT signaling or data for the second SIM (160). As a result the paging resources of the PLMN are wasted.

FIG. 4 illustrates a scenario of paging by the AMF controller (200) when the first SIM (150) of the multi-SIM UE (100) is in N1 connected mode, according to the prior art.

Referring to the FIG. 4, at step 1, consider that the AMF controller (200) receives the MT notification. Consider that the multi-SIM UE (100) is in N1 CONNECTED mode for the first SIM (150). Further, an operation is ongoing over the first SIM (150) of the multi-SIM UE (100) and hence the second SIM (160) is inactive.

However, the AMF controller (200) is unaware that the operation is ongoing over the first SIM (150) of the multi-SIM UE (100) and starts paging the second SIM (160) continuously. As result of the continuous paging by the AMF controller (200) to the second SIM (160), the network resources such as the paging resources are wasted.

FIG. 5 illustrates a method for initiating the MT services to the multi-SIM UE (100) in the wireless communication network, according to the embodiments as disclosed herein.

Referring to the FIG. 5, in conjunction with the FIG. 4, consider that the AMF is in possession of the context of the first SIM (150) and the context of the second SIM (160) of the multi-SIM UE (100). At step 1, the AMF receives one of the downlink data or the signaling for the second SIM (160). At step 2, the AMF sends one of the paging message and the NOTIFICATION message over the N1 NAS connection of the first SIM (150) to the multi-SIM UE (100) when the N1 NAS is in the CM CONNECTED state or otherwise for the first SIM (150). In an example, the AMF may indicate an identifier associated with the second SIM (160) such as the GUTI while sending one of the paging message and the NOTIFICATION message over the N1 NAS connection of the first SIM (150) to the multi-SIM UE (100).

At step 3, the multi-SIM UE (100) based on one of the NOTIFICATION message triggers the service request for the second SIM (160) context and moves to the connected mode over the second SIM (160). Therefore, unlike to the conventional methods and systems, in the proposed method the wireless communication network does not execute the paging procedure for the second SIM (160) and hence saves the paging resources. Further, if the multi-SIM UE (100) decides to respond to the NOTIFICATION message for the second SIM (160), then the multi-SIM UE (100) directly initiates the service request with the wireless communication network over the second SIM (160). As a result, the paging resources which would have been wasted in the conventional methods and systems are drastically saved due to the proposed method.

FIG. 6 illustrates a scenario where the second SIM (160) neglects the paging messages from the wireless communication network when the first SIM (150) of the multi-SIM UE (100) is in the N1 connected mode, according to the prior art.

Referring to the FIG. 6, in conjunction with the FIG. 4, at step 2, the paging messages sent by the AMF to the second SIM (160) comprises a paging cause which indicates the reason for paging the multi-SIM UE (100).

At step 3, the multi-SIM UE (100) reads the paging cause and decides to not respond to the paging messages received from the wireless communication network. Generally, the multi-SIM UE (100) decides not to respond to the paging messages if one of: the multi-SIM UE (100) is in connected mode over the first SIM (150) and the multi-SIM UE (100) is performing higher priority operation over the first SIM (150).

However, at the network side, the AMF is not aware that the multi-SIM UE (100) has decided not to respond to the paging messages and thus the AMF continues with a paging retry strategy which leads to a tremendous amount of paging resources wastage.

FIG. 7 illustrates a scenario a method for managing paging where the second SIM (160) neglects the paging messages from the wireless communication network when the first SIM (150) of the multi-SIM UE (100) is in N1 connected mode, according to an embodiment as disclosed herein.

Referring to the FIG. 7, in conjunction with the FIG. 6, at step 3, the multi-SIM UE (100) receives the NOTIFICATION message for the second SIM (160) over the NAS N1 signaling connection of the first SIM (150) context and reads the paging cause. The multi-SIM UE (100) decides to not respond to the NAS messages received from the wireless communication network based on the paging cause. Further, the multi-SIM UE (100) responds over the same NAS N1 signaling connection of the first SIM (150) context that the multi-SIM UE (100) will not respond to the notification for the second SIM (160). The multi-SIM UE (100) responds over the same NAS N1 signaling connection of the first SIM (150) context as part of the NOTIFICATION RESPONSE message. Therefore, unlike to the conventional methods and systems, in the proposed method, the AMF is notified about the intention of the multi-SIM UE (100) of not responding to the paging message for the second SIM (160).

FIG. 8 illustrates a core network solution for paging only in specific cells, according to an embodiment as disclosed herein.

Consider that the multi-SIM UE (100) is a multi UMTS subscriber identity module (MUSIM) UE capable of supporting multiple USIMs. Therefore, the terms multi-SIM UE (100) and MUSIM UE (100) are used interchangeably.
Issue:
Consider the MUSIM UE (100) capable of supporting multiple USIMs, is registered on the same PLMN i.e. with the same AMF.

USIM-1 is in connected mode.
The core network (CN) receives downlink data for USIM-2.

Core network pages the MUSIM UE (100) for USIM-2 following the prior art paging strategy. For example one of the paging strategies can be CN will page the MUSIM UE (100) in all possible cells of the registered area.

Core network does not take into account the current state or last contacted cell details of USIM-1 context to decide which area to be paged for USIM-2. This will lead to paging resource wastage.
Core Network Solution:
CN can store the last cell MUSIM UE (100) was in connected mode over one of the USIM's of the same device (or MUSIM UE (100)). For example USIM-1.

CN receives or generates downlink data or signaling for any of the other USIM's context. CN uses last cell in which one of the USIM's of the same device had contacted the CN for example cell-3.

CN decides to page only in cell-3 for its first attempt.

I.e. in general CN decides which cells to page the MUSIM UE (100) based on one of the USIMs mobility behavior residing on the same device.

FIG. 9 illustrates an access network solution for paging strategy based on one of the USIM(s) mobility behavior residing on the MUSIM UE (100), according to an embodiment as disclosed herein.

The access network solution (AN) includes the AN can store the last cell MUSIM UE (100) was in connected mode over one of the USIM's of the same device (or MUSIM UE (100)). For example USIM-1. The AN receives or generates downlink data or signaling for any of the other USIM's context. The AN uses last cell in which one of the USIM's of the same device had contacted the AN for example cell-3. The AN decides to page only in cell-3 for its first attempt. I.e. in general the AN decides which cells to page the MUSIM UE (100) based on one of the USIMs mobility behavior residing on the same device (or UE).

FIG. 10 illustrates a method and system for paging on both alternate USIM's N1 signaling connection and the paging, according to an embodiment as disclosed herein.

Issue: For critical services like an emergency, mission-critical etc. When DL data or signaling is received network will notify or page the MUSIM UE (100) in one of the below possible ways of reaching the MUSIM UE (100).

Directly paging the target MUSIM UE (100) for which DL signaling or data is pending—or, Notifying on NAS signaling connection of alternate USIM which is residing over the same device or MUSIM UE (100).

Due to an abnormal situation in the chosen path if the MUSIM UE (100) is not reached then it can create a delay in reaching the MUSIM UE (100) and hence critical service can get impacted.

Solution: For critical services like an emergency, mission-critical etc. network can use both the possible ways as listed below to reach the MUSIM UE (100) i.e. it can create redundancy to increase the reliability in the system.

Directly paging the target MUSIM UE (100) for which DL signaling or data is pending and, Notifying on NAS signaling connection of alternate USIM which resides over the same device or MUSIM UE (100).

FIG. 11 illustrates a method for addressing a scenario when the MUSIM UE (100) is not switching the RF between multiple USIMs, according to an embodiment as disclosed herein.
Issue:
Consider the MUSIM UE (100) with subset of the USIMs or all the USIMs are registered with the same PLMN operator (for example same AMF).

However, the MUSIM UE (100) in IDLE mode monitors the paging channel (i.e. paging occasion or paging opportunity) for all the USIMs. This step consumes battery as well it can create paging collision issues.

Solution: If AMF stores the context of multiple USIM's belonging to the same device, then the AMF can indicate the same to the MUSIM UE (100) in the information element (for example IE_Sameoperator). I.e. the USIM's for which binding is stored in the AMF. Due to this indication in IE_Sameoperator MUSIM UE (100) whenever is in connected mode over one of the USIM's, the MUSIM UE (100) will expect the notification to be received over NAS N1 signaling connection of the connected mode USIM for all other USIM's whenever there is any downlink data or signaling.

For example let us assume a MUSIM UE is having 3 USIMs—USIM-1, USIM-2, and USIM-3. Let's assume after PLMN selection all the 3 MM contexts of different USIMs registers with the same AMF.

AMF can indicate that USIM-1, USIM-2, and USIM-3 are stored with it to the MUSIM UE (100). The MUSIM UE (100) based on this indication whenever one of the USIMs gets into a connected mode (for example USIM-2) then the MUSIM UE (100) will not monitor the paging channel (i.e. paging occasion or paging opportunity) for all other USIM's rather it will expect a notification message to be sent to the MUSIM UE (100) over USIM-2 NAS N1 signaling connection. This notification message will indicate for which USIM there is a downlink data or signaling is pending to be received i.e. in this example USIM-3 or USIM-1. The MUSIM UE (100) will trigger service request procedure as if the paging was received for respective USIM for example USIM-1 or USIM-3.

Also network (for example AMF or gNodeB) can indicate to the MUSIM UE (100) which USIM context it has to monitor when the MUSIM UE (100) goes into IDLE mode. In other words the network can provide common paging occasion for all the USIMs to the MUSIM UE (100). Due to this the MUSIM UE (100) will start monitoring only one paging occasion or paging opportunity for all the USIM's which are registered to the common network. In this way the MUSIM UE (100) can start avoiding to read the paging occasion or paging opportunity for all the USIM's which are registered to the same network. In this embodiment its mentioned that only one USIM's paging occasion or paging opportunity or paging channel will be read by the UE but it can be subset of USIM's which are registered to the same network.

In this embodiment the term paging channel refers to paging occasion or paging opportunity which is indicated to the MUSIM UE (100) by network. The paging occasion or paging opportunity is opportunity for the MUSIM UE (100) to read and see if there is any downlink data or downlink signaling is pending to be delivered to the MUSIM UE (100). If the MUSIM UE (100) receives paging message in its paging channel i.e. during paging occasion or paging opportunity then the MUSIM UE (100) responds to it and establishes its bearers so that data or signaling can be delivered to the MUSIM UE (100).

In this embodiment gNode B can understand that multiple USIM's belong to the same MUSIM UE (100) or device based on indication from Core network i.e. AMF.

The embodiments disclosed herein can be implemented through at least one software program running on at least one hardware device and performing network management functions to control the elements. The elements include blocks, elements, actions, acts, steps, or the like which can be at least one of a hardware device, or a combination of hardware device and software module.

The foregoing description of the specific embodiments will so fully reveal the general nature of the embodiments herein that others can, by applying current knowledge, readily modify and or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method performed by an access and mobility function (AMF) entity in a wireless communication system, the method comprising:
    performing with a multi-subscriber identity module (SIM) user equipment (UE), a first registration procedure associated with registering a first SIM of the multi-SIM UE;
    receiving, from the multi-SIM UE, a second registration request message associated with registering a second SIM of the multi-SIM UE, wherein the second registration request message includes a globally unique temporary identifier (GUTI) allocated to the first SIM via the first registration procedure; and
    transmitting, to the multi-SIM UE, information indicating that a first context of the first SIM and a second context of the second SIM are stored in the same AMF entity,
    wherein the information indicating that the first context and the second context are stored in the same AMF entity is associated with not monitoring a paging channel in case that one of the first SIM and the second SIM is in a connected state.

2. The method of claim 1, further comprising:
    in case that the first SIM is in the connected state, transmitting, to the multi-SIM UE, a non-access stratum (NAS) message over a connection of the first SIM, wherein the NAS message includes a paging cause parameter associated with the second SIM.

3. The method of claim 2, wherein the paging cause parameter is associated with determining whether the multi-SIM UE is able to respond to the NAS message.

4. The method of claim 3, in response to the NAS message, receiving, from the multi-SIM UE, a NAS response message indicating that the multi-SIM UE is not able to respond to the NAS message.

5. A method performed by a multi-subscriber identity module (SIM) user equipment (UE) in a wireless communication system, the method comprising:
    performing, with an access and mobility function (AMF) entity, a first registration procedure associated with registering a first SIM of the multi-SIM UE;
    transmitting, to the AMF entity, a second registration request message associated with registering a second SIM of the multi-SIM UE, wherein the second registration request message includes a globally unique temporary identifier (GUTI) allocated to the first SIM via the first registration procedure; and
    receiving, from the AMF entity, information indicating that a first context of the first SIM and a second context of the second SIM are stored in the same AMF entity,
    wherein based on the information indicating that the first context and the second context are stored in the same AMF entity, a paging channel is not monitored in case that one of the first SIM and the second SIM is in a connected state.

6. The method of claim 5, further comprising:
    in case that the first SIM is in the connected state, receiving, from the AMF entity, a non-access stratum (NAS) message over a connection of the first SIM, wherein the NAS message includes a paging cause parameter associated with the second SIM.

7. The method of claim 6, further comprising:
    determining whether the multi-SIM UE is able to respond to the NAS message, based on the paging cause parameter.

8. The method of claim 7, further comprising:
transmitting, to the AMF entity, a NAS response message indicating that the multi-SIM UE is not able to respond to the NAS message.

9. An access and mobility function (AMF) entity in a wireless communication system, the AMF entity comprising:
a transceiver; and
at least one processor coupled with the transceiver and configured to:
perform with a multi-subscriber identity module (SIM) user equipment (UE) via the transceiver, a first registration procedure associated with registering a first SIM of the multi-SIM UE;
receive, from the multi-SIM UE via the transceiver, a second registration request message associated with registering a second SIM of the multi-SIM UE, wherein the second registration request message includes a globally unique temporary identifier (GUTI) allocated to the first SIM via the first registration procedure; and
transmit, to the multi-SIM UE via the transceiver, information indicating that a first context of the first SIM and a second context of the second SIM are stored in the same AMF entity,
wherein the information indicating that the first context and the second context are stored in the same AMF entity is associated with not monitoring a paging channel in case that one of the first SIM and the second SIM is in a connected state.

10. A multi-subscriber identity module (SIM) user equipment (UE) in a wireless communication system, the multi-SIM UE comprising:
a transceiver; and
at least one processor coupled with the transceiver and configured to:
perform with an access and mobility function (AMF) entity via the transceiver, a first registration procedure associated with registering a first SIM of the multi-SIM UE;
transmit, to the AMF entity via the transceiver, a second registration request message associated with registering a second SIM of the multi-SIM UE, wherein the second registration request message includes a globally unique temporary identifier (GUTI) allocated to the first SIM via the first registration procedure; and
receive, from the AMF entity via the transceiver, information indicating that a first context of the first SIM and a second context of the second SIM are stored in the same AMF entity,
wherein based on the information indicating that the first context and the second context are stored in the same AMF entity, a paging channel is not monitored in case that one of the first SIM and the second SIM is in a connected state.

* * * * *